(12) United States Patent
Pechanec et al.

(10) Patent No.: US 10,191,783 B2
(45) Date of Patent: Jan. 29, 2019

(54) UDP MULTICAST OVER ENTERPRISE SERVICE BUS

(75) Inventors: Jiri Pechanec, Mokra-Horakov (CZ); Martin Vecera, Brno (CZ)

(73) Assignee: Red Hat, Inc., Raleigh, NC (US)

(*) Notice: Subject to any disclaimer, the term of this patent is extended or adjusted under 35 U.S.C. 154(b) by 1518 days.

(21) Appl. No.: 12/713,518

(22) Filed: Feb. 26, 2010

(65) Prior Publication Data

US 2011/0213844 A1    Sep. 1, 2011

(51) Int. Cl.
*G06F 15/16* (2006.01)
*G06F 9/52* (2006.01)

(52) U.S. Cl.
CPC ............................ *G06F 9/52* (2013.01)

(58) Field of Classification Search
CPC ........................................... G06F 9/52
USPC ............................................. 709/206
See application file for complete search history.

(56) References Cited

U.S. PATENT DOCUMENTS

| | | | |
|---|---|---|---|
| 7,454,484 B1* | 11/2008 | He | H04L 41/0213 709/223 |
| 7,549,160 B1* | 6/2009 | Podar | G06F 21/10 380/229 |
| 7,561,598 B2* | 7/2009 | Stratton et al. | 370/507 |
| 7,856,019 B2* | 12/2010 | Shah et al. | 370/390 |
| 8,095,670 B2* | 1/2012 | Brown et al. | 709/229 |
| 8,095,923 B2* | 1/2012 | Harvey et al. | 717/171 |
| 8,356,018 B2* | 1/2013 | Lunde | 707/692 |
| 8,480,497 B2* | 7/2013 | Gagner et al. | 463/42 |
| 2003/0095504 A1* | 5/2003 | Ogier | H04L 1/1614 370/235 |
| 2006/0002320 A1* | 1/2006 | Costa-Requena et al. | 370/312 |
| 2006/0140213 A1* | 6/2006 | Hwang | H04L 12/18 370/466 |
| 2008/0240130 A1* | 10/2008 | Oved | G06F 9/541 370/401 |
| 2008/0288639 A1* | 11/2008 | Ruppert | G06F 8/60 709/225 |
| 2008/0306751 A1* | 12/2008 | Conroy | G06Q 10/00 705/301 |
| 2009/0055888 A1* | 2/2009 | Little | 726/1 |
| 2009/0077251 A1* | 3/2009 | Brown | H04L 67/16 709/230 |
| 2009/0313614 A1* | 12/2009 | Andrade et al. | 717/151 |
| 2010/0169475 A1* | 7/2010 | Woundy et al. | 709/224 |
| 2011/0125821 A1* | 5/2011 | Roshen | G06F 9/546 709/201 |
| 2011/0302254 A1* | 12/2011 | Yu | 709/206 |

* cited by examiner

*Primary Examiner* — Oleg Survillo
*Assistant Examiner* — Tan Doan
(74) *Attorney, Agent, or Firm* — Lowenstein Sandler LLP

(57) ABSTRACT

An apparatus and a method for sending a message from an enterprise service bus (ESB) is described. A message is formed at an enterprise service bus (ESB) of a computer system. The message is transmitted from the ESB to different ESBs through a User Datagram Protocol (UDP) multicast.

14 Claims, 2 Drawing Sheets

UDP MULTICAST OVER ENTERPRISE SERVICE BUS

TECHNICAL FIELD

Embodiments of the present invention relate to computing systems, and more particularly, to a process for transmitting messages over a computer network.

BACKGROUND

Messages can be sent between various applications of a computer system. These messages can be sent individually to a group of other applications. However, the number of messages can add up quickly and can easily clog up any bandwidth.

BRIEF DESCRIPTION OF THE DRAWINGS

The present invention is illustrated by way of example, and not by way of limitation, in the figures of the accompanying drawings and in which.

DETAILED DESCRIPTION

Figure 1:
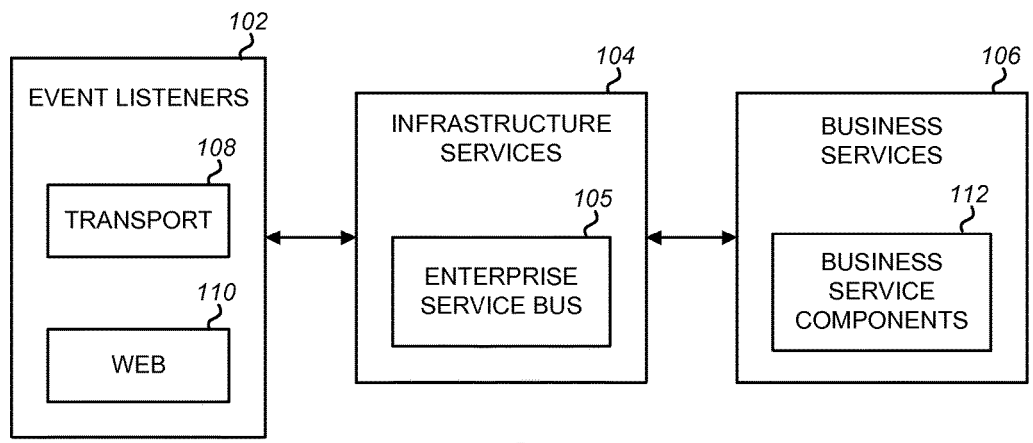
FIG. 1 is a block diagram illustrating one embodiment of a computer system architecture with enterprise service bus (ESB).

Described herein is an apparatus and a method for sending a message from an enterprise service bus (ESB). A message is formed at an enterprise service bus (ESB) of a computer system. The message is transmitted from the ESB to different ESBs through a User Datagram Protocol (UDP) multicast.

An enterprise service bus (ESB) consists of a software architecture construct which provides fundamental services for complex architectures via an event-driven and standards-based messaging-engine (the bus). Developers typically implement an ESB using technologies found in a category of middleware infrastructure products, usually based on recognized standards.

An ESB generally provides an abstraction layer on top of an implementation of an enterprise messaging system, which allows integration architects to exploit the value of messaging without writing code. Unlike the more classical enterprise application integration (EAI) approach of a monolithic stack in a hub and spoke architecture, an enterprise service bus builds on base functions broken up into their constituent parts, with distributed deployment where needed, working in harmony as necessary.

An ESB does not itself implement a service-oriented architecture (SOA) but provides the features with which one may implement such. An ESB builds on the basis of standards and provide flexibility, supporting many transport media capable of implementing both traditional SOA patterns as well as SOA 2.0-enriched business architecture. ESBs attempt to isolate the coupling between the service called and the transport medium. Most ESB providers incorporate SOA principles and allow for independent message formats.

A service-oriented architecture (SOA) is a flexible set of design principles used during the phases of systems development and integration. A deployed SOA-based architecture will provide a loosely-integrated suite of services that can be used within multiple business domains.

SOA also generally provides a way for consumers of services, such as web-based applications, to be aware of available SOA-based services. For example, several disparate departments within a company may develop and deploy SOA services in different implementation languages; their respective clients will benefit from a well understood, well defined interface to access them. XML is commonly used for interfacing with SOA services, though this is not required.

SOA defines how to integrate widely disparate applications for a world that is Web based and uses multiple implementation platforms. Rather than defining an API, SOA defines the interface in terms of protocols and functionality. An endpoint is the entry point for such an SOA implementation.

Service-orientation requires loose coupling of services with operating systems, and other technologies that underlie applications. SOA separates functions into distinct units, or services, which developers make accessible over a network in order to allow users to combine and reuse them in the production of applications. These services and their corresponding consumers communicate with each other by passing data in a well-defined, shared format, or by coordinating an activity between two or more services.

Enterprise Application Integration is an integration framework composed of a collection of technologies and services which form a middleware to enable integration of systems and applications across the enterprise.

Supply chain management applications (for managing inventory and shipping), customer relationship management applications (for managing current and potential customers), business intelligence applications (for finding patterns from existing data from operations), and other types of applications (for managing data such as human resources data, health care, internal communications, etc) typically cannot communicate with one another in order to share data or business rules. For this reason, such applications are sometimes referred to as islands of automation or information silos. This lack of communication leads to inefficiencies, wherein identical data are stored in multiple locations, or straightforward processes are unable to be automated.

Enterprise application integration (EAI) is the process of linking such applications within a single organization together in order to simplify and automate business processes to the greatest extent possible, while at the same time avoiding having to make sweeping changes to the existing applications or data structures.

FIG. 1 is a block diagram illustrating one embodiment of a SOA using an Enterprise Service Bus (ESB). The ESB is seen as the next generation of EAI. As such, many of the capabilities of a good ESB minor those of existing EAI offerings. Traditional EAI stacks consist of: Business Process Monitoring, Integrated Development Environment, Human Workflow User Interface, Business Process Management, Connectors, Transaction Manager, Security, Application Container, Messaging Service, Metadata Repository, Naming and Directory Service, Distributed Computing Architecture.

As with EAI systems, ESB is not about business logic that is left to higher levels. It is about infrastructure logic. ESB is part of an SOA infrastructure. ESBs typically come with a few assumptions that are not inherent to SOA:

Java specific.

Run-time message mediator.

Message translation.

Security model translation.

Loose coupling does not require a mediator to route messages, although that is dominant ESB architecture. This is also a requirement within the JBI specification. The ESB model should not restrict the SOA model, but should be seen as a concrete representation of SOA. As a result, if there is a conflict between the way SOA would approach something and the way in which is may be done in a traditional ESB, the SOA approach will win.

Therefore, in JBossESB, mediation will be a deployment choice and not a mandatory requirement. Obviously for compliance with certain specifications it may be configured by default, but if developers do not need that compliance point, they should be able to remove it (generally or on a per service basis).

One large challenge of EAI is that the various systems that need to be linked together often reside on different operating systems, use different database solutions and different computer languages, and in some cases are legacy systems that are no longer supported by the vendor who originally created them. In some cases, such systems are dubbed "stovepipe systems" because they consist of components that have been jammed together in a way that makes it very hard to modify them in any way.

Event listener module 102 includes transport module 108 and web module 110. Transport module 108 includes for example transports such as HTTP, FTP, Emails, among others. Web module 110 includes for example, Java scripts.

Data received from event listener module 102 is provided to an infrastructure service module. Infrastructure module 104 as previously described includes Enterprise Service Bus 105 (ESB). ESB 105 communicates with business services module 106. For example, business service module 106 includes business service components 112 (Java, Web services, etc. . . . ). One ESB may want to communicate with another ESB over a public channel.

Figure 2:
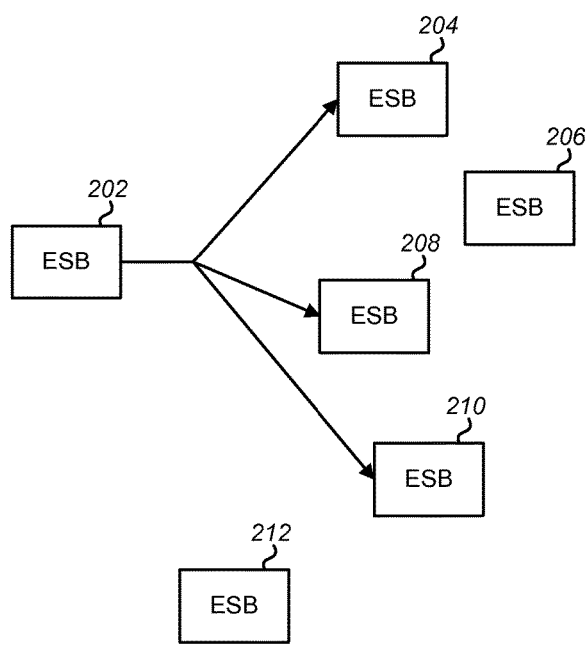
FIG. 2 is a block diagram illustrating one embodiment of an ESB system for UDP multicasting.

FIG. 2 is a block diagram illustrating one embodiment of a UDP multicast of a message from an ESB. ESB 202 multicasts a message to other ESBs (204, 208, and 210). Multicast addressing is a network technology for the delivery of information to a group of destinations simultaneously using the most efficient strategy to deliver the messages over each link of the network only once, creating copies only when the links to the multiple destinations split.

The word "multicast" is typically used to refer to IP multicast which is often employed for streaming media and Internet television applications. In IP multicast the implementation of the multicast concept occurs at the IP routing level, where routers create optimal distribution paths for datagrams sent to a multicast destination address spanning tree in real-time. At the Data Link Layer, multicast describes one-to-many distribution such as Ethernet multicast addressing, Asynchronous Transfer Mode (ATM) point-to-multipoint virtual circuits or Infiniband multicast.

Multicast is a technique for one-to-many communication over an IP infrastructure in a network. It scales to a larger receiver population by not requiring prior knowledge of who or how many receivers there are. Multicast uses network infrastructure efficiently by requiring the source to send a packet only once, even if it needs to be delivered to a large number of receivers. The nodes in the network take care of replicating the packet to reach multiple receivers only when necessary. The most common low-level protocol to use multicast addressing is User Datagram Protocol (UDP).

Key concepts in IP multicast include an IP multicast group address, a multicast distribution tree and receiver driven tree creation. An IP multicast group address is used by sources and the receivers to send and receive content. Sources use the group address as the IP destination address in their data packets. Receivers use this group address to inform the network that they are interested in receiving packets sent to that group. For example, if some content is associated with group 239.1.1.1, the source will send data packets destined to 239.1.1.1. Receivers for that content will inform the network that they are interested in receiving data packets sent to the group 239.1.1.1. The receiver "joins" 239.1.1.1. The protocol used by receivers to join a group is called the Internet Group Management Protocol (IGMP).

Once the receivers join a particular IP multicast group, a multicast distribution tree is constructed for that group. The protocol most widely used for this is Protocol Independent Multicast (PIM). It sets up multicast distribution trees such that data packets from senders to a multicast group reach all receivers which have joined the group. For example, all data packets sent to the group 239.1.1.1 are received by receivers who joined 239.1.1.1. There are many different variations of PIM implementations: Sparse Mode (SM), Dense Mode (DM), Source Specific Mode (SSM) and Bidirectional Mode (Bidir, or Sparse-Dense Mode, SDM). Of these, PIM-SM is the most widely deployed as of 2006; SSM and Bidir are simpler and scalable variations developed more recently are gaining in popularity.

IP multicast operation does not require a source sending to a given group to know about the receivers of the group. The multicast tree construction is initiated by network nodes which are close to the receivers or is receiver driven. This allows it to scale to a large receiver population.

Figure 3:
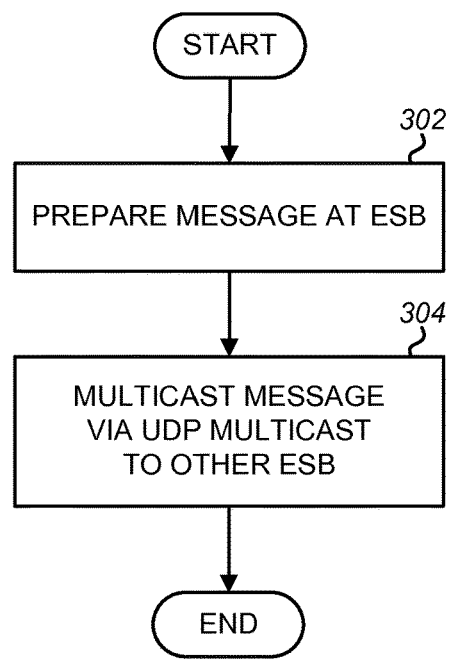
FIG. 3 is a flow diagram illustrating one embodiment of a method for multicasting messages from an ESB to other ESBs.

FIG. 3 is a flow diagram illustrating one embodiment of a method for multicasting messages from an ESB to other ESBs. At 302, an ESB prepares a message to be multicast to other ESBs. At 304, the ESB sends one message through UDP multicast. The message is subsequently picked up by subscribed ESB.

Figure 4:
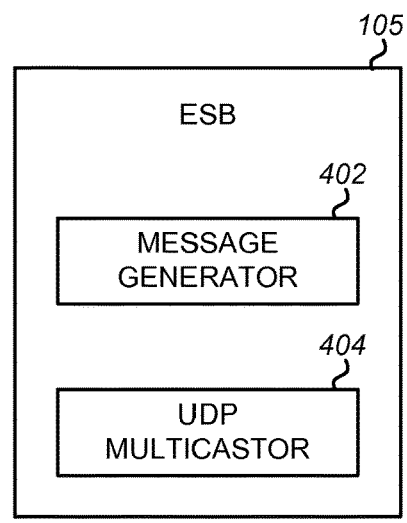
FIG. 4 is a block diagram illustrating one embodiment of an ESB for UDP multicasting.

FIG. 4 illustrates a diagrammatic representation of an ESB 105 in the exemplary form of a computer system within which a set of instructions, for causing the machine to perform any one or more of the methodologies discussed herein, may be executed. In alternative embodiments, the ESB 105 may be connected (e.g., networked) to other machines in a LAN, an intranet, an extranet, or the Internet. The machine 105 may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system includes a processing device comprising a processing device comprising a message generator 402 and a UDP multicastor 404, a main memory (e.g., read-only memory (ROM), flash memory, dynamic random access memory (DRAM) such as synchronous DRAM (SDRAM), a static memory (e.g., flash memory, static random access memory (SRAM), etc.), and a data storage device, which communicate with each other via a bus.

Message generator 402 is configured to prepare and form a message from the ESB.

UDP multicastor 404 is configured to multicast the message via UDP multicast to one or more ESBs subscribed to the feed.

The processing device represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device may also be one or more special-purpose processing devices such as an application specific integrated circuit (ASIC), a field programmable gate array (FPGA), a digital signal processor (DSP), network processor, or the like. The processing device is configured to execute modules 402, 404 for performing the operations and steps discussed herein with. In one embodiment, modules 402, 404 may be include hardware or software or a combination of both.

The computer system may further include a network interface device. The computer system also may include a video display unit (e.g., a liquid crystal display (LCD) or a cathode ray tube (CRT)), an alphanumeric input device (e.g., a keyboard), a cursor control device (e.g., a mouse), and a signal generation device (e.g., a speaker).

Data storage device may include a non-transitory computer-accessible storage medium on which is stored one or more sets of instructions embodying any one or more of the methodologies or functions described herein. The software may also reside, completely or at least partially, within the main memory and/or within the processing device during execution thereof by the computer system, the main memory and the processing device also constituting computer-accessible storage media. The software may further be transmitted or received over a network via the network interface device.

The computer-accessible storage medium may also be used to store unpacked new and released builds. While the computer-accessible storage medium is shown in an exemplary embodiment to be a single medium, the term "computer-accessible storage medium" should be taken to include a single medium or multiple media (e.g., a centralized or distributed database, and/or associated caches and servers) that store the one or more sets of instructions. The term "computer-accessible storage medium" shall also be taken to include any medium that is capable of storing, encoding or carrying a set of instructions for execution by the machine and that cause the machine to perform any one or more of the methodologies of the present invention. The term "computer-accessible storage medium" shall accordingly be taken to include, but not be limited to, solid-state memories, optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving application data from an event listener comprising a transport component and a web component by a processing device of an infrastructure service system, wherein the infrastructure service system comprises a first enterprise service bus (ESB) associated with an enterprise messaging system, wherein the application data comprises business rules to be shared between a first application in communication with the first ESB and a second application in communication with a second ESB associated with the enterprise messaging system;

forming, using the application data, a message by the processing device; and transmitting, by the processing device, via the first ESB, the message via User Datagram Protocol (UDP) multicast over a public channel to a multicast address associated with a plurality of receivers associated with the second ESB, wherein the second ESB is subscribed to the multicast address.

2. The method of claim 1, wherein the first ESB comprises an abstraction layer associated with the enterprise messaging system.

3. The method of claim 1, wherein the first ESB is associated with a plurality of business applications.

4. The method of claim 1, wherein the first ESB is associated with a Service-Oriented Architecture (SOA) model.

5. The method of claim 1, wherein the first ESB is in communication with a plurality of business service components.

6. A non-transitory computer-readable storage medium, having instructions stored therein, to cause a processing device of an infrastructure service system comprising a first enterprise service bus (ESB) associated with an enterprise messaging system to:

receive application data from an event listener comprising a transport component and a web component, wherein the application data comprises business rules to be shared between a first application in communication with the first ESB and a second application in communication with a second ESB associated with the enterprise messaging system;

form, using the application data, a message; and transmit, via a first ESB, the message via User Datagram Protocol (UDP) multicast over a public channel to a multicast address associated with a plurality of receivers associated with the second ESB, wherein the second ESB is subscribed to the multicast address.

7. The non-transitory computer-readable storage medium of claim 6, wherein the first ESB comprises an abstraction layer associated with the enterprise messaging system.

8. The non-transitory computer-readable storage medium of claim 6, wherein the first ESB is associated with a plurality of business applications.

9. The non-transitory computer-readable storage medium of claim 6, wherein the first ESB is associated with a Service-Oriented Architecture (SOA) model.

10. The non-transitory computer-readable storage medium of claim 6, wherein the first ESB is in communication with a plurality of business service components.

11. An infrastructure service system comprising:
a memory; and
a processing device operatively coupled to the memory, configured to:
receive application data from an event listener comprising a transport component and a web component, wherein the application data comprises business rules to be shared between a first application in communication with the first ESB and a second application in communication with a second ESB associated with the enterprise messaging system;
generate, using the application data, a message; and
transmit, via a first Enterprise Service Bus (ESB) of the infrastructure service system, the message via User Datagram Protocol (UDP) multicast over a public channel to a multicast address associated with a plurality of receivers associated with the second ESB, wherein the second ESB is subscribed to the multicast address.

12. The computer system of claim 11, wherein the first ESB comprises an abstraction layer associated with an enterprise messaging system.

13. The computer system of claim 11, wherein the first ESB is associated with a Service-Oriented Architecture (SOA) model.

14. The computer system of claim 11, wherein the first ESB is in communication with a plurality of business service components.

* * * * *